(12) United States Patent
Oguro (10) Patent No.: US 6,937,779 B2
(45) Date of Patent: Aug. 30, 2005

(54) OPTICAL MODULE

(75) Inventor: Mamoru Oguro, Tokyo (JP)

(73) Assignee: NEC Corporation, Tokyo (JP)

( * ) Notice: Subject to any disclaimer, the term of this patent is extended or adjusted under 35 U.S.C. 154(b) by 332 days.

(21) Appl. No.: 09/996,557

(22) Filed: Nov. 30, 2001

(65) Prior Publication Data

US 2002/0067892 A1 Jun. 6, 2002

(30) Foreign Application Priority Data

Dec. 1, 2000 (JP) ........................................ 2000-367314

(51) Int. Cl.[7] ............................ G02B 6/12; H01L 21/20
(52) U.S. Cl. .............................. 385/14; 385/31; 385/43; 385/129; 385/130; 385/131; 438/29; 438/31
(58) Field of Search ............................ 385/14, 31, 42, 385/43, 45, 129, 130, 131, 132; 438/29, 31

(56) References Cited

U.S. PATENT DOCUMENTS

| | | | | |
|---|---|---|---|---|
| 4,182,545 | A | * | 1/1980 | Greer .......................... 385/88 |
| 5,098,804 | A | * | 3/1992 | Booth ........................... 430/1 |
| 5,303,315 | A | * | 4/1994 | Granestrand ................. 385/16 |
| 5,392,372 | A | * | 2/1995 | Kurata et al. .................. 385/88 |
| 5,481,632 | A | * | 1/1996 | Hirai et al. .................... 385/49 |
| 5,657,338 | A | * | 8/1997 | Kitamura ..................... 372/50 |
| 5,844,929 | A | * | 12/1998 | Lealman et al. .............. 372/45 |
| 5,910,012 | A | | 6/1999 | Takeuchi ..................... 438/31 |
| 6,037,189 | A | * | 3/2000 | Goto ........................... 438/31 |
| 6,108,481 | A | | 8/2000 | Tohyama et al. ........... 385/131 |
| 2002/0067892 | A1 | * | 6/2002 | Oguro .......................... 385/49 |
| 2002/0141682 | A1 | * | 10/2002 | Ryu et al. ..................... 385/14 |

FOREIGN PATENT DOCUMENTS

| | | | |
|---|---|---|---|
| EP | 0 696 747 A2 | 2/1996 | ............... 385/14 X |
| JP | 61-226717 | 10/1986 | ............... 385/43 X |
| JP | 63-60413 | 3/1988 | ............... 385/14 X |
| JP | 6-163874 | 6/1994 | ............... 385/43 X |
| JP | 8-171032 | 7/1996 | ............... 385/14 X |
| JP | 9-218321 | 8/1997 | ............... 385/42 X |
| JP | 11-68705 | 3/1999 | ............... 385/14 X |
| JP | 2000-249868 | 9/2000 | ............... 385/14 X |
| JP | 2000-275457 | 10/2000 | ............... 385/14 X |
| JP | 2001-506373 | 5/2001 | ............... 385/14 X |
| WO | WO/98/27449 | 6/1998 | ............... 385/14 X |

OTHER PUBLICATIONS

Japanese Office Action dated Oct. 13, 2004 (with partial English translation).
*1.3/1.55 μm WDM Optical Module for Full Duplex Operation Using PLC Platform*, Hashimoto, S. et al., 1998 Electronic Information Communication Association Electronics Society Conference, Sep. 7, 1998 Publication; Presentation Compilation 1, p. 244, C–3–110.
European Search Report dated Apr. 29, 2004.

(Continued)

*Primary Examiner*—Brian M. Healy
(74) *Attorney, Agent, or Firm*—McGinn & Gibb, PLLC (57) ABSTRACT

An optical module includes a waveguide. In one aspect, an optical active element and an optical waveguide are formed separately, with the optical waveguide being optically coupled to the optical active element, and with the optical waveguide including a spot-size conversion region. In another aspect, a refractive index matching resin, having the same-level refractive index as that of the optical waveguide, is provided between the waveguide and the optical active element. In a further aspect, the waveguide is a Y-type branch waveguide in which a single-mode waveguide section is branched into first and second branch waveguide sections. In a yet another aspect, a device which divides lights of different wavelengths is provided to reflect light of a first wavelength and pass light of another wavelength, separating incoming light from outgoing light.

13 Claims, 9 Drawing Sheets

OTHER PUBLICATIONS

Uchida, et al., "Low–Cost Hybrid WDM Module Consisting of a Spot–Size Converter Integrated Laser Diode and a Waveguide Photodiode on a PLC Platform for Access Network Systems", IEICE Trans. Electron., vol. E80–C, No. 1, Jan. 1997, pp. 88–97.

Goodwill, et al., "Polymer Tapered Waveguides and Flip–Chip Solder Bonding as Compatible Technologies for Efficient OEIC Coupling", Electronic Components and Technology Conference, 1997, pp. 788–796.

Office Action on corresponding Japanese patent application, with translation of Examiner's comments.

* cited by examiner

OPTICAL MODULE

BACKGROUND OF THE INVENTION

The present invention relates to an optical module for use in an optical communication system.

Recently, development of an optical module using a PLC (Planar Lightwave Circuit), which has a laser diode (LD), a photo diode (PD) and electric elements integrated, has progressed in an optical communication system. For example, in the Electronics Society Meeting C-3-6, 1997, of the Electronic Information Communication Society and in JP-A-191152/1997 were proposed an optical module having a light-emitting element (the LD and so forth) and a photoreceptive element (the PD and so forth) mounted on a waveguide substrate.

Figure 10:
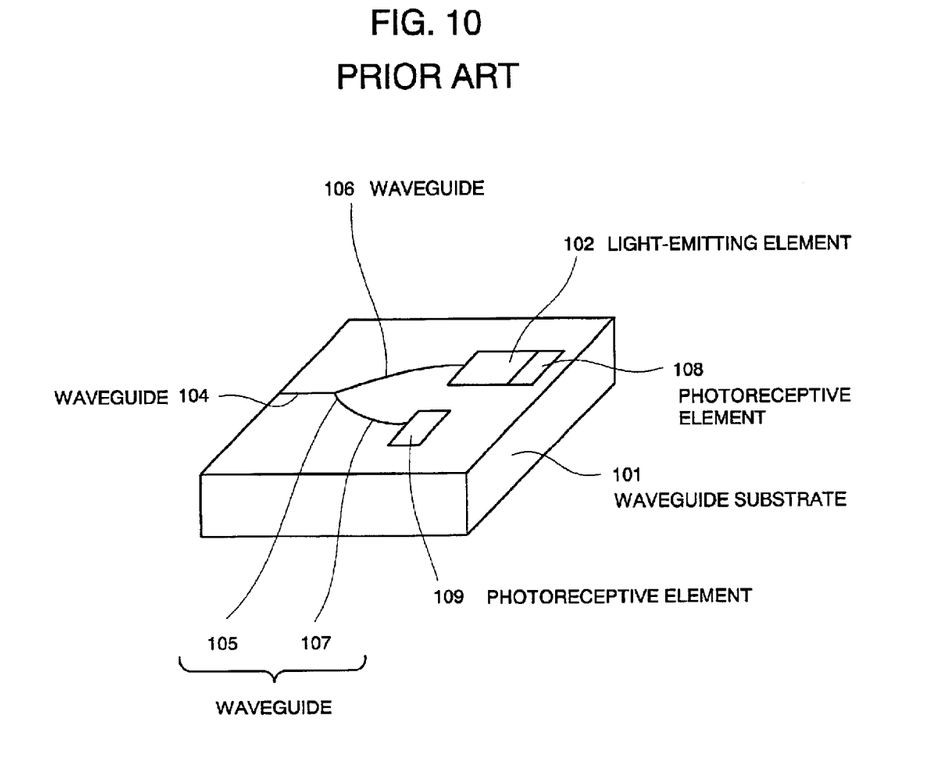
FIG. 10 is a perspective view illustrating a schematic configuration of the conventional optical module.

FIG. 10 is a perspective view illustrating a schematic configuration of the optical module disclosed in the above-mentioned documents. This optical module is a module having a light-emitting element 102 and photoreceptive elements 108 and 109 mounted on a waveguide substrate 101 in which waveguides 104 to 107 were formed. The waveguides 104 to 107 configure the waveguide having a symmetrical Y-branch structure as a whole. Namely, this symmetrical Y-branch waveguide includes one single-mode waveguide section (waveguide 104), a taper section (waveguide 105) in which the waveguide spreads about two times, and a branch waveguide section (waveguides 106 and 107). The end face of the waveguide 104 is optically coupled to the end face of an optical fiber which introduces the send light to the exterior or into which the receive light from the exterior is introduced. The end face of the waveguide 106 is optically coupled to one side's light-emitting surface of the light-emitting element 102, and the end face of the waveguide 107 is optically coupled to the photoreceptive surface of the photoreceptive element 109. The photoreceptive element 108, which is a photoreceptive element for a send monitor, is provided so that the photoreceptive surface thereof faces the other-side's light-emitting surface (backside) of the light-emitting element 102.

In this optical module, light emitted from one side's light-emitting surface of the light-emitting element 102 is propagated through the waveguides 106, 105 and 104 sequentially and is output, and the above output light is propagated to the exterior via the optical fiber. On the other hand, input light from the optical fiber is propagated sequentially through the waveguides 104, 105 and 107 to enter the photoreceptive surface of the photoreceptive element 109, and is converted into an electric signal. Light emitted from the backside of the light-emitting element 102 is received in the photoreceptive element 108 for the send monitor.

By connecting the optical modules such as described above via the optical fiber, bi-directional communication becomes possible.

In the optical module, high optical output power, high photoreceptive sensitivity and cost reduction are indispensable, and as one of the important tasks for accomplishing these are cited highly efficient optical couplings between the optical active element such as the light-emitting element and the photoreceptive element, and the waveguide, and between the optical fiber and the waveguide.

In general, as to the optical fiber and the optical waveguide, a photoreceptive angle at which incident light is guided has been determined, and light that entered beyond its photoreceptive angle is not guided, resulting in an optical loss. For example, with the optical fiber, the photoreceptive angle is up to 5° in a single mode system, and up to 12° in a multi-mode system. For this reason, for example, so as to carry out a highly efficient coupling between the light-emitting element and the waveguide, it is necessary to cause the send light from the light-emitting element to efficiently enter the waveguide within a determined photoreceptive angle to restrain the optical coupling loss at a low level. But, since the conventional optical module described above did not include such a configuration, room was still left for improving in this point.

Additionally, it was proposed that, by using a micro optical system such as a lens and a tip-ball fiber (one having the tip section of the optical fiber processed in a sphere) to convert a large angle of divergence of the LD into a small photoreceptive angle of the optical waveguide, optical coupling efficiency between the LD and the waveguide was enhanced; however, in this case, parts such as the lens increase, and simultaneously, assembling process increases, whereby the problem occurs in terms of the cost reduction.

SUMMARY OF THE INVENTION

An objective of the present invention is to settle the above-mentioned tasks to provide the optical module that can simply realize the highly efficient optical coupling between the optical active element and the waveguide.

The objective of the present invention is to provide an optical module in which an optical active element and an optical waveguide are optically coupled, characterized in that a spot-size conversion region configured by gradually increasing or reducing a width or a thickness of a waveguide, or both thereof is provided at the end or inside of said optical waveguide to which said optical active element is coupled optically.

Also, the optical active element is a light-emitting element; and said spot-size conversion region is configured by reducing a width or a thickness of a waveguide, or both thereof all the more in said light-emitting element side.

Also, the optical active element is a photoreceptive element; and said spot-size conversion region is configured by increasing a width or a thickness of a waveguide, or both thereof all the more in said photoreceptive element side.

Also, refractive index matching resin having the same-level refractive index as that of said optical waveguide is charged in the optical coupling part between said optical waveguide and said optical active element.

Also, the optical waveguide is a Y-type branch optical waveguide wherein one single-mode waveguide was branched into a first and a second branch waveguides;

said optical active element includes:

a light-emitting element being optically coupled to said first branch waveguide; and a photoreceptive element being optically coupled to said second branch waveguide; and said spot-size conversion region includes:

a first spot-size conversion region configured by reducing a width or a thickness of a waveguide, or both thereof all the more in said light-emitting element side, said first spot-size conversion region being provided at the end or inside of said first branch waveguide to which said light-emitting element is optically coupled; and a second spot-size conversion region configured by increasing a width or a thickness of a waveguide, or both thereof all the more in said photoreceptive element side, said second spot-size conversion region being provided at the end or inside of said second branch waveguide to which said photoreceptive element is optically coupled.

Also, refractive index matching resin having the same-level refractive index as that of said single-mode waveguide is charged in the optical coupling part between said single-mode waveguide and an optical fiber.

Also, the other optical module comprises:

a function which divides lights with different wavelength lights, which is put between said one single-mode waveguide and Y branch part, wavelength selection means of reflecting light with a first wavelength which is emitted from said light-emitting element towards said second branch waveguide, and of transmitting light with a second wavelength, different from said first wavelength, which is guided by said second branch waveguide toward said one single-mode waveguide, characterized in that:

said optical waveguide is a Y-type branch optical waveguide wherein one single-mode waveguide was branched into a first and a second branch waveguides;

said optical active element includes:

a light-emitting element being optically coupled to said first branch waveguide; and a photoreceptive element being optically coupled to said single-mode waveguide; and said spot-size conversion region includes:

a first spot-size conversion region configured by reducing a width or a thickness of a waveguide, or both thereof all the more in said light-emitting element side, said first spot-size conversion region being provided at the end of said first branch waveguide to which said light-emitting element is optically coupled; and a second spot-size conversion region configured by increasing a width or a thickness of a waveguide, or both thereof all the more in said photoreceptive element side, said second spot-size conversion region being provided at the end or inside of said single-mode waveguide to which said photoreceptive element is optically coupled.

Also, refractive index matching resin having the same-level refractive index as that of said second branch waveguide is charged in the optical coupling part between said second branch waveguide and an optical fiber.

In order to solve the above-mentioned tasks, the optical module of the present invention, which is an optical module in which an optical active element and an optical waveguide are optically coupled, is characterized in that a spot-size conversion region configured by gradually increasing or reducing a width or a thickness of the waveguide, or both thereof is provided at the end of said optical waveguide to which said optical active element is optically coupled.

Hereinafter, an operation of the present invention will be described.

In general, in the event of the optical waveguide, since a refractive index difference between a core and a clad is large, a spot-size of light that is guided by the optical waveguide, which is on the order of a sub-micron, is extremely small. Herein, as to what is referred to as the spot-size, in the event that a distribution of light was approximated to a Gaussian distribution, it is a width (half-valued width) in which its power distribution becomes $1/e^2$ of a peak value. With the spot-size, the coupling efficiency η of the case in which two Gaussian beams, W1 and W2, are coupled is represented by $$\eta = 4/(W1/W2 + W2/W1)^2 \quad (1)$$

It is apparent from the above-mentioned equation (1) that, so as to reduce the optical coupling loss between two optical waveguides, the spot-sizes of light that is guided by both the optical waveguides should be caused to accord (refer to Kenji Kouno, "Basis And Application of Optical Coupling Systems For Optical Devices" (Gendai Kougakusya)).

The photoreceptive angle of the optical waveguide is inversely proportional to the spot-size. Namely, the photoreceptive angle (also an angle of divergence of light being emitted) increases when the spot-size is reduced, and to the contrary, the photoreceptive angle (also an angle of divergence of light being emitted) reduces when the spot-size is increased. In the present invention, the highly efficient optical coupling between the optical active element and the waveguide is accomplished by utilizing it.

In the spot-size conversion region that is configured by reducing a width or a thickness of the waveguide, or both thereof all the more in the light-emitting element side, the spot-size of the optical waveguide comes to be reduced, whereby, for example, a large angle of divergence of the LD can be converted into a small photoreceptive angle of the optical waveguide.

In the spot-size conversion region that is configured by increasing a width or a thickness of the waveguide, or both thereof all the more in the photoreceptive element side, the spot-size of the optical waveguide comes to be expanded, whereby an angle of divergence of light being emitted from the optical waveguide becomes small and, as a result, efficiency of light incident on the photoreceptive element becomes high.

Since the spot-size conversion region described above is a part of a waveguide structure, it can be built therein together with the optical waveguide, thereby not incurring an increase in the manufacturing process.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Next, embodiments of the optical module of the present invention will be explained in reference to the accompanied drawings.

(Embodiment 1)

Figure 1:
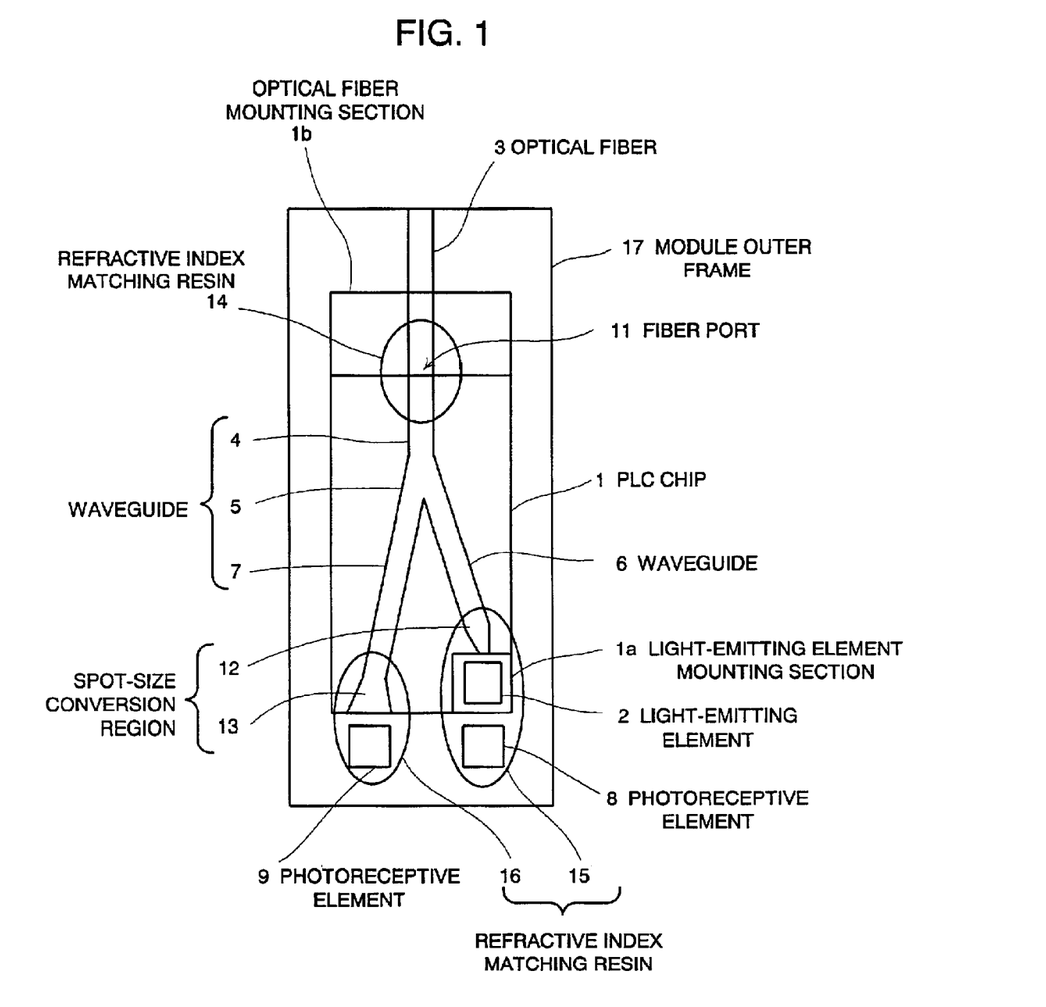
FIG. 1 is a top plan view illustrating a schematic configuration of an optical transmitter/receiver module that is a first embodiment of the present invention.

FIG. 1 is a top plan view illustrating a schematic configuration of an optical transmitter/receiver module that is a first embodiment of the present invention. This optical transmitter/receiver module has a structure in which: a PLC chip 1 in which waveguides 4 to 7, a light-emitting element mounting section 1a and an optical fiber mounting section 1b were formed; a light-emitting element 2 such as the LD mounted on the light-emitting element mounting section 1a on the PLC chip 1; an optical fiber 3 that introduces the send light outside the module or introduces the receive light from the exterior within the module, which was mounted on the optical fiber mounting section 1b on the PLC chip 1; and photoreceptive elements 8 and 9 such as the PD were provided on a substrate and were contained within a module outer frame 17.

The waveguides 4 to 7 configure the waveguide having a symmetric Y-type branch structure as a whole. Namely, this symmetric Y-type branch waveguide includes one single-mode waveguide section (waveguide 4), a taper section (waveguide 5) in which the waveguide spreads approximately two times, and a branch waveguide section (waveguide 6 and 7) including two single-mode waveguides with the same dimension. A fiber port 11 of the end of the waveguide 4 and the end face of the optical fiber 3 are optically coupled, and respective spot-sizes of the fiber port 11 and the optical fiber 3 are almost the same.

Figure 2:
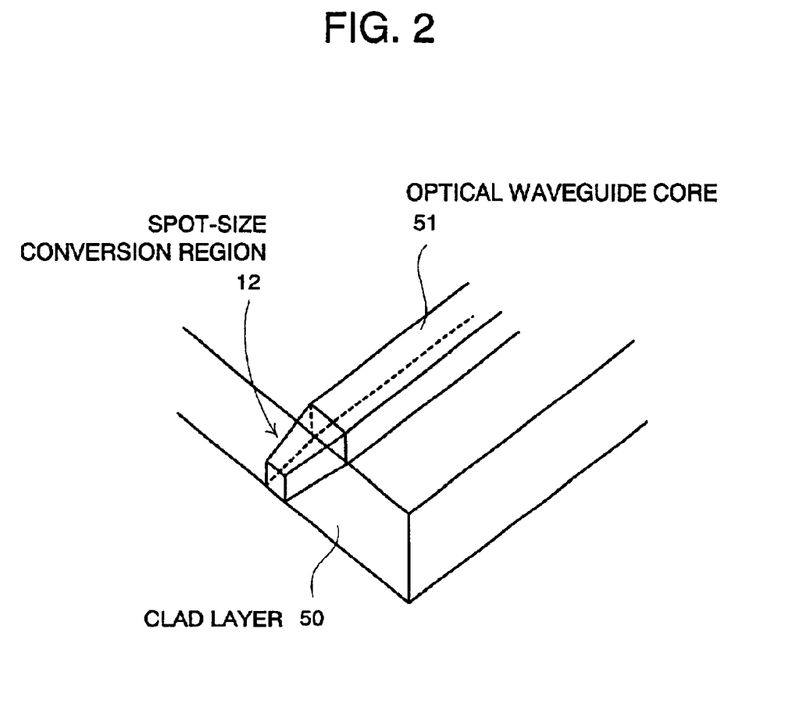
FIG. 2 is an enlarged perspective view of a spot-size conversion region of a light-emitting element side shown in FIG. 1.

A spot-size conversion region 12 is provided at the end of the waveguide 6. FIG. 2 is an enlarged perspective view of the spot-size conversion region 12. In an example shown in FIG. 2, the waveguide 6 includes a structure in which an optical waveguide core 51 was surrounded by a clad layer 50, and the end face of the optical waveguide core 51 is the spot-size conversion region 12. This spot-size conversion region 12 has a structure reducing gradually a thickness and a width of the core toward the core end face side.

The end face of this spot-size conversion region 12 faces the light-emitting surface of the light-emitting element 2, and light emitted from the light-emitting surface of the light-emitting element 2 enters the end face of the spot-size conversion region 12 with a pre-determined spot-size.

The above-mentioned spot-size conversion region 12 is a section that reduces the spot-size of light that is guided by the waveguide 6, and thereby the spot-size of light that is guided by the waveguide 6 can be approximated to the spot-size (spot-size of an emitted beam) of the light-emitting element 2. By causing the spot-size of light that is guided by the waveguide 6 and the spot-size of the light-emitting element 2 to accord, coupling efficiency can be enhanced.

Figure 3:
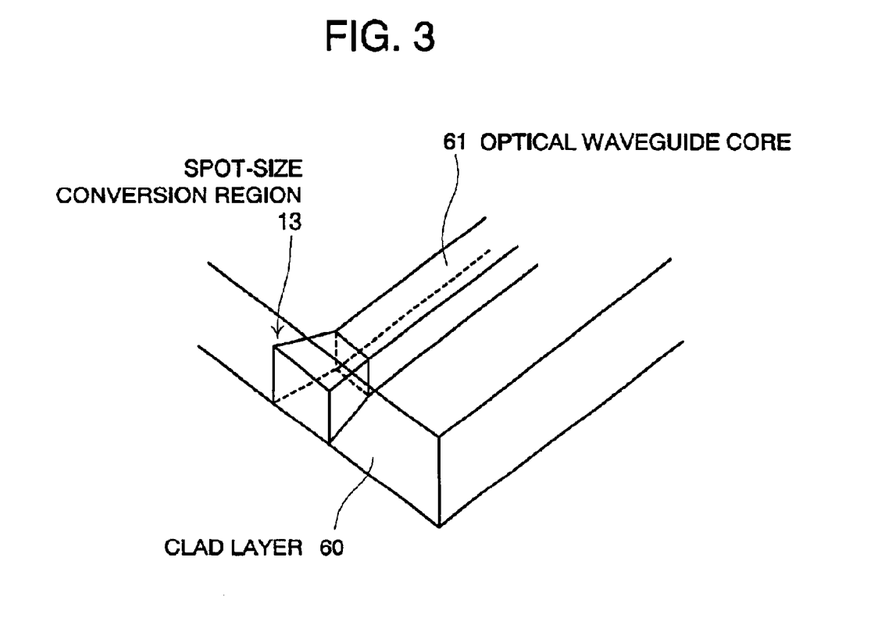
FIG. 3 is an enlarged perspective view of a spot-size conversion region of a photoreceptive element side shown in FIG. 1.

At the end of the waveguide 7 is provided a spot-size conversion region 13. FIG. 3 is an enlarged perspective view of the spot-size conversion region 13. In an example shown in FIG. 3, the waveguide 7 includes a structure in which an optical waveguide core 61 was surrounded by a clad layer 60, and the end face of the optical waveguide core 61 is the spot-size conversion region 13. This spot-size conversion region 13 has a structure expanded gradually so that a thickness and a width of the core become large all the more in the core end face side. The end face of this spot-size conversion region 13 faces the photoreceptive surface of the photoreceptive element 9, and light emitted from its end face enters the photoreceptive surface of the photoreceptive element 9 with a pre-determined spot-size.

The above-mentioned spot-size conversion region 13 is a section that expands the spot-size of light that is guided by the waveguide 7, and thereby an angle of divergence of light being emitted from the waveguide 7 can be reduced and it becomes possible to cause light being emitted from the waveguide 7 to efficiently enter the photoreceptive surface of the photoreceptive element 9.

As the light-emitting element 2, a Fabry-Perot laser (FP-LD), a distribution feedback type laser (DFB-LD) that are a semiconductor laser, and so forth can be employed. The photoreceptive element 8, which is a photoreceptive element such as the PD for the send monitor, is provided so that the photoreceptive surface thereof faces the other side's light-emitting surface (backside) of the light-emitting element 2.

In the optical coupling part between the fiber port 11 of the waveguide 4 and the optical fiber 3, so as to enhance optical coupling efficiency and simultaneously reduce reflection at the end face, refractive index matching resin 14 is charged. Similarly, refractive index matching resin 15 is charged in the optical coupling part between the port part (including the spot-size conversion region 12) of the light-emitting element 2 side of the waveguide 6 and the light-emitting element 2, and in the optical coupling part between the light-emitting element 2 and the photoreceptive element 8, and refractive index matching resin 16 is charged in the optical coupling part between the PD port (including the spot-size conversion region 13) of the photoreceptive element 9 side in the waveguide 7 and the photoreceptive element 9. Any of the refractive index matching resin 14 to 16 has the same-level refractive index as that of the waveguide.

The optical waveguide core size except the spot-size conversion region 12 and 13 is such a size (the spot-size of the fiber port side of the optical waveguide=the spot-size of the optical fiber) to obtain the optimal optical-coupling between it and the optical fiber 3. As the optical fiber 3, any of a single-mode fiber (SMF) and a multi-mode fiber (MMF) may be employed.

Next, an operation of the optical transmitter/receiver module of this embodiment will be explained specifically.

Firstly, a send operation (a light-emitting element-optical waveguide coupling) will be explained. The send light emitted from the front of the light-emitting element (LD) enters the end face of the spot-size conversion region 12 in front of the LD port section via the refractive index matching resin 15. In this embodiment, the spot-size conversion region 12 was provided, whereby the spot-size of the waveguide 6 end face and that of the light-emitting element 2 are almost the same size, and the send light emitted from the light-emitting element 2 efficiently enters the interior of the waveguide 6. Also, in this embodiment, the send light entered in the waveguide 6 passes through the spot-size conversion region 12, so the spot-size of the send light is expanded from that of the light-emitting element 2 to that of the optical fiber 3. The send light that entered the interior of the waveguide 6 is propagated sequentially through the waveguides 5 and 4 to efficiently enter the optical fiber 3 through the fiber port 11. This send light that entered is introduced to a transmission line outside the module by the optical fiber 3.

On the other hand, the monitor light emitted from the backside of the light-emitting element 2 is received in the photoreceptive element 8 and is converted into an electric signal. Based on this output signal of the photoreceptive element 8, the send status can be supervised.

Continually, a receive operation (a photoreceptive element-optical waveguide coupling) will be explained. The receive light, which entered through the exterior transmission line via the optical fiber 3, efficiently enters the waveguide 4 through the fiber port 11, is propagated sequentially through the waveguides 5 and 7 to proceed to the spot-size conversion region 13 of the PD port side. In this embodiment, the spot-size of light that is guided by the waveguide 7 has been increased by the spot-size conversion region 13, whereby the receive light being emitted from the waveguide 7 via the spot-size conversion region 13 efficiently enters the photoreceptive surface of the photoreceptive element (PD) 9 at a small angle of divergence and is converted into an electric signal.

Next, a specific effect of each coupling section of the optical transmitter/receiver module of this embodiment will be explained.

Figure 4:
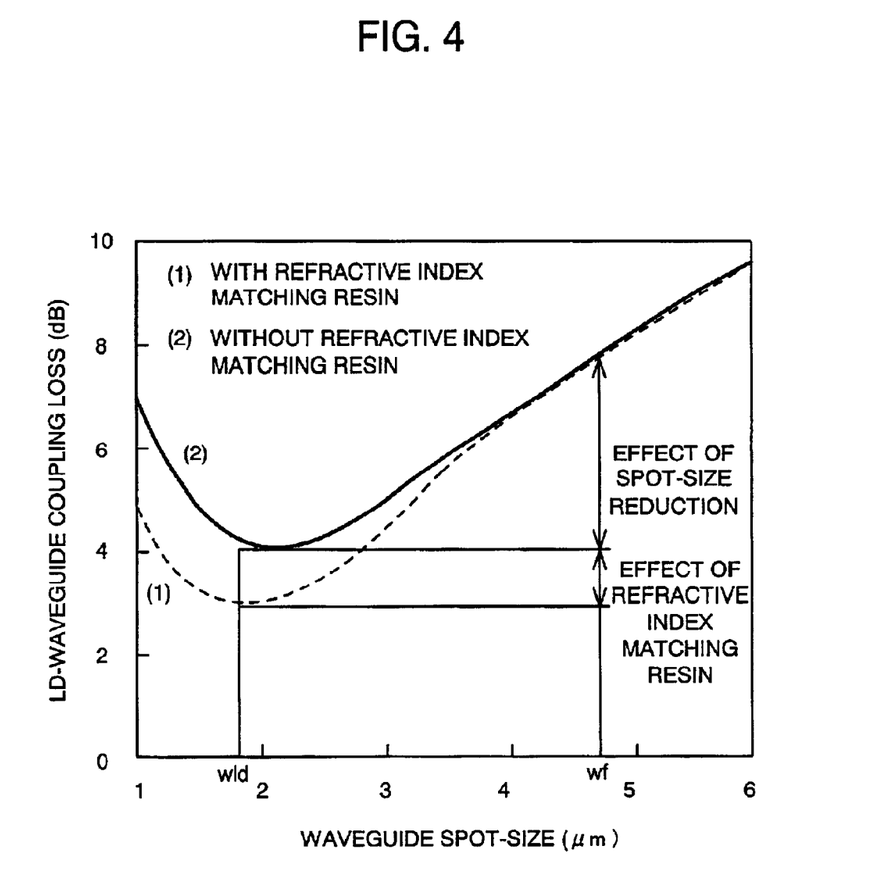
FIG. 4 is a characteristic diagram illustrating a relation of a LD-optical waveguide coupling loss against a spot-size of a LD port optical waveguide end.

(1) The Optical Coupling Part between the Light-Emitting Element (LD) and the Optical Waveguide:

In FIG. 4, is illustrated a relation of the LD-optical waveguide coupling loss against the spot-size of the LD port optical waveguide end. In FIG. 4, a dashed line ((1)) illustrates the case that the refractive index matching resin is charged in the optical coupling section, and a continuous line ((2)) illustrates the case that the refractive index matching resin 15 is not charged. In an example shown in this FIG. 4, by reducing the spot-size of the LD port optical waveguide end from wf, which is the spot-size of the fiber port, to the spot-size wld, which is about (⅖)·wf thereof (approximating it to the spot-size of the LD), the optical coupling loss is improved by about 4 dB in the event that the refractive index matching resin is not present, and in the event that the refractive index matching resin is present, it is furthermore improved by 1 dB. Thus, in accordance with the optical transmitter/receiver module of this embodiment, reduction of the optical coupling loss can be realized with not only the spot-size conversion region 12, but also the refractive index matching resin 15.

Figure 5:
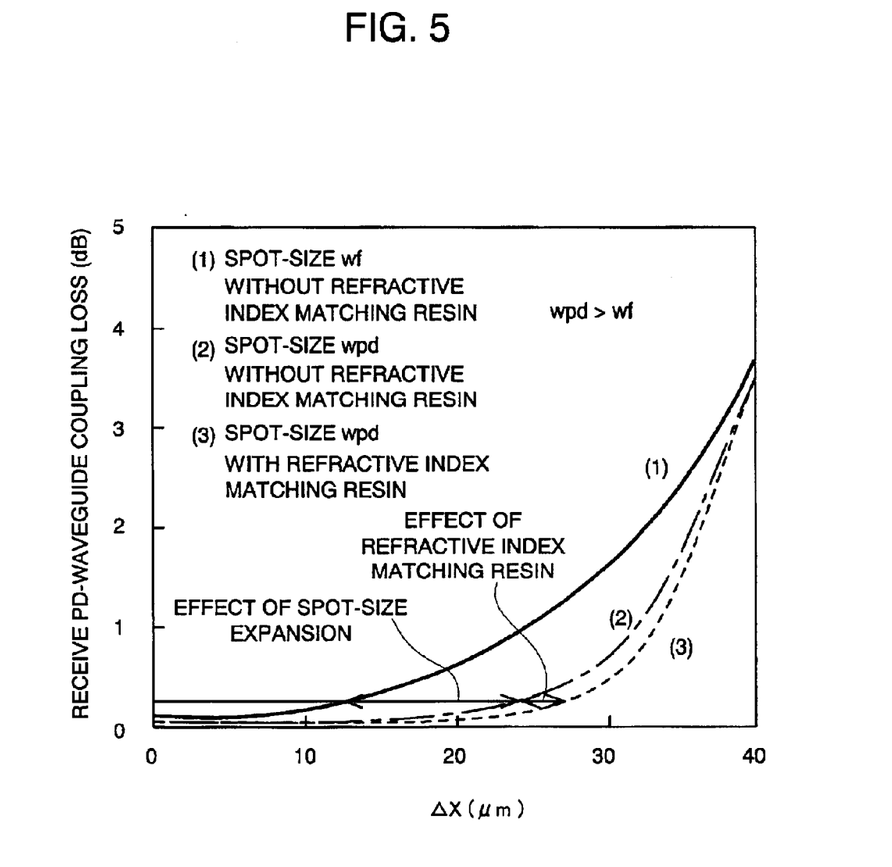
FIG. 5 is a characteristic diagram illustrating a relation of a PD-optical waveguide coupling loss against a deviation quantity ΔX between an optical waveguide core and a PD photoreceptive surface.
Figure 6:
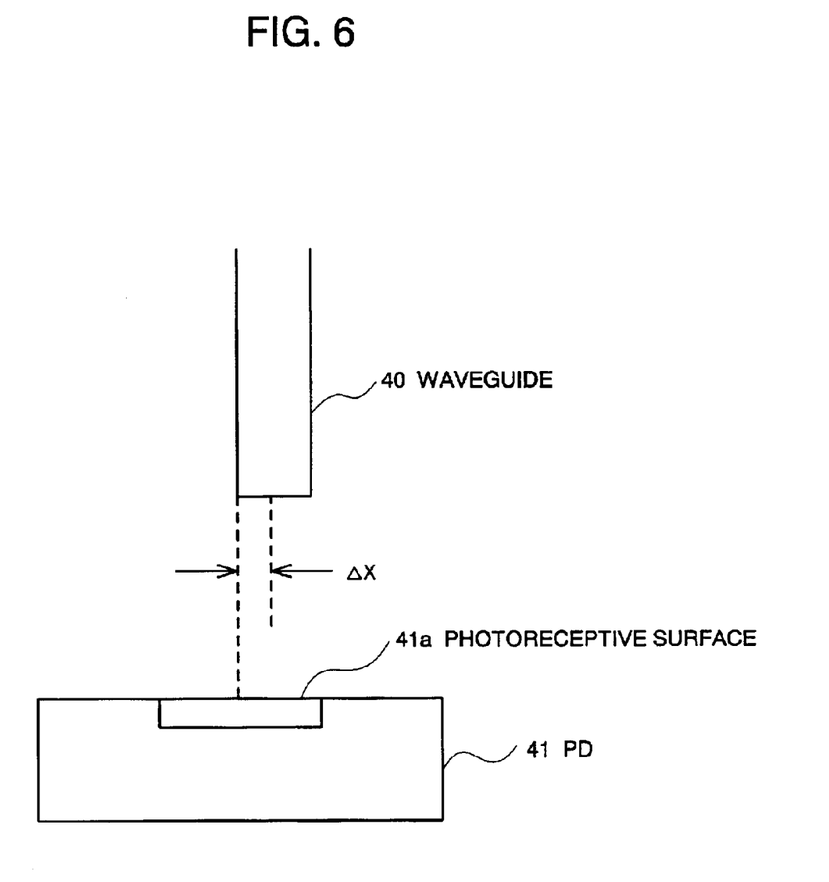
FIG. 6 is a model-type view illustrating a deviation between the center of the photoreceptive surface and the center of the core of the waveguide.

(2) The Optical Coupling Part between the Photoreceptive Element (PD) and the Optical Waveguide:

(2-a) Expansion of a Mounting Tolerance:

In FIG. 5, is illustrated a relation of the PD-optical waveguide coupling loss against a deviation quantity $\Delta X$ between the optical waveguide core and the PD photoreceptive surface. In FIG. 5, a continuous line ((1)) illustrates the case that the spot-size of the optical waveguide core is wf and yet the refractive index matching resin is not charged, a chain line ((2)) the case that the spot-size of the optical waveguide core is wpd and yet the refractive index matching resin is not charged, and a dashed line ((3)) the case that the spot-size of the optical waveguide core is wpd and yet the refractive index matching resin is charged respectively. Herein, what is referred to as the deviation quantity $\Delta X$ is, specifically, a deviation between the center of a photoreceptive surface 41a of a PD 41 and the center of the core of a waveguide 40 as shown in FIG. 6. Also, the spot-size wf is a spot-size of the fiber port, and the spot-size wpd is about two times of the spot-size wf.

In an example shown in FIG. 5, by expanding the spot-size of the PD port optical weaveguide end from wf to wpd, in the event that the refractive index matching resin is not present, a mounting tolerance can be expanded by 12 $\mu$m with the optical coupling loss 0.3 dB, and in the event that the refractive index matching resin 16 is present, the mounting tolerance can be furthermore expanded by 3 $\mu$m. Thus, in accordance with the optical transmitter/receiver module of this embodiment, the optical coupling loss between the photoreceptive element 9 and the waveguide 7 is suppressed at a low level by the spot-size conversion region 13, simultaneously expansion of the mounting tolerance can be realized, and moreover the mounting tolerance can be expanded further by the refractive index matching resin 16.

Figure 7:
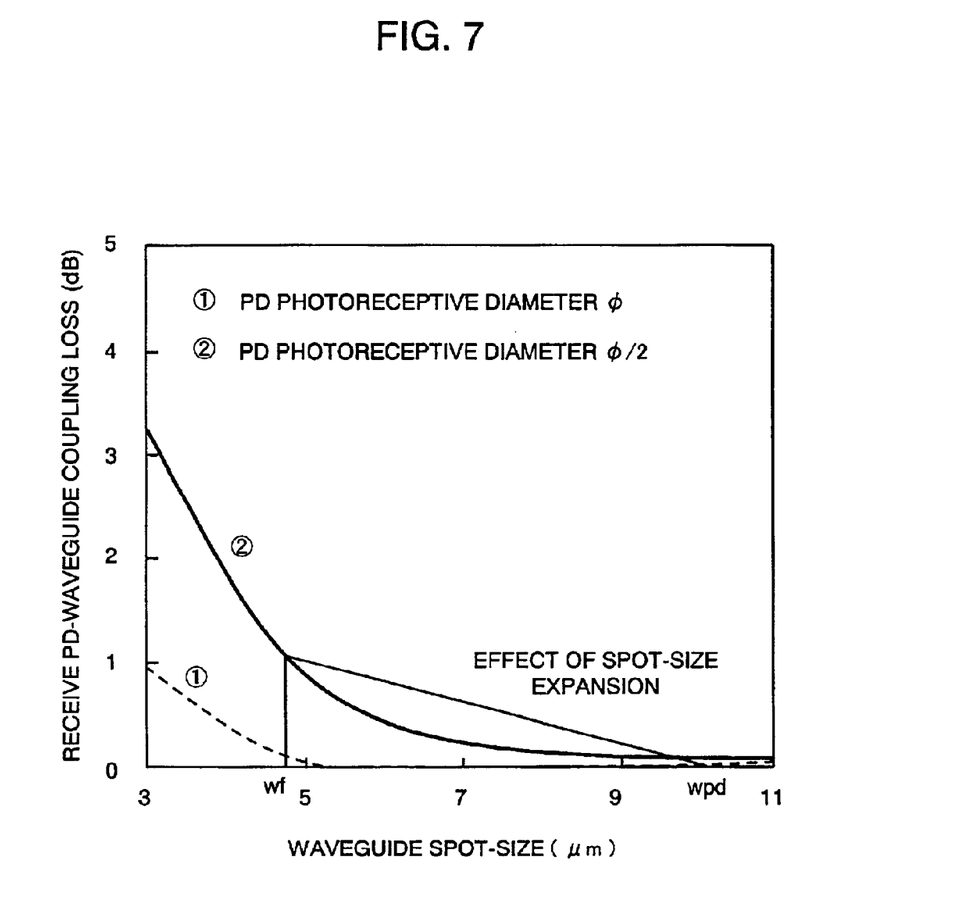
FIG. 7 is a characteristic diagram illustrating a relation of a PD-optical waveguide coupling loss against the spot-size of a PD port optical waveguide end.

(2-b) Miniaturization of a Photoreceptive Diameter of the Photoreceptive Element (PD):

In FIG. 7, is illustrated a relation of the PD-optical waveguide coupling loss against the spot-size of the PD port optical waveguide end. In FIG. 7, a dashed line ((1)) illustrates the case of the PD photoreceptive diameter $\phi$ and a continuous line ((2)) the case of the PD photoreceptive diameter $\phi/2$ respectively. The PD photoreceptive diameter $\phi$ means the maximum diameter of light that the PD can receive, and herein the dimension of the PD photoreceptive surface is denoted with this photoreceptive diameter. Also, the spot-size wf is a spot-size of the fiber port, and the spot-size wpd is about two times of the spot-size wf.

As apparent from FIG. 7, in the event that the spot-size is wf, the PD-optical waveguide coupling loss is nearly zero dB with the PD photoreceptive diameter $\phi$, but, when the PD photoreceptive diameter is reduced from $\phi$ to $\phi/2$, the PD-optical waveguide coupling loss becomes 1 dB and more, and the coupling efficiency reduces. On the other hand, in the event that the spot-size is wpd, even though the PD photoreceptive diameter is reduced from $\phi$ to $\phi/2$, its PD-optical waveguide coupling loss is nearly zero dB.

This indicates that, by expanding the spot-size from wf to wpd, the PD photoreceptive diameter can be reduced from $\phi$ to $\phi/2$.

From the foregoing, in the optical transmitter/receiver module of this embodiment, by expansion of the spot-size using the spot-size conversion region 13, miniaturization and cost reduction of the photoreceptive element 9 can be realized.

(2-c) A High-Speed Response of the Photoreceptive Element (PD):

As described above (2-b), expansion of the spot-size of the PD port end enables reduction of the PD photoreceptive diameter of the photoreceptive element 9, whereby capacity between the PD terminals can be reduced. When the capacity between the PD terminals becomes small, the high-speed response of the photoreceptive element 9 becomes possible.

Figure 8:
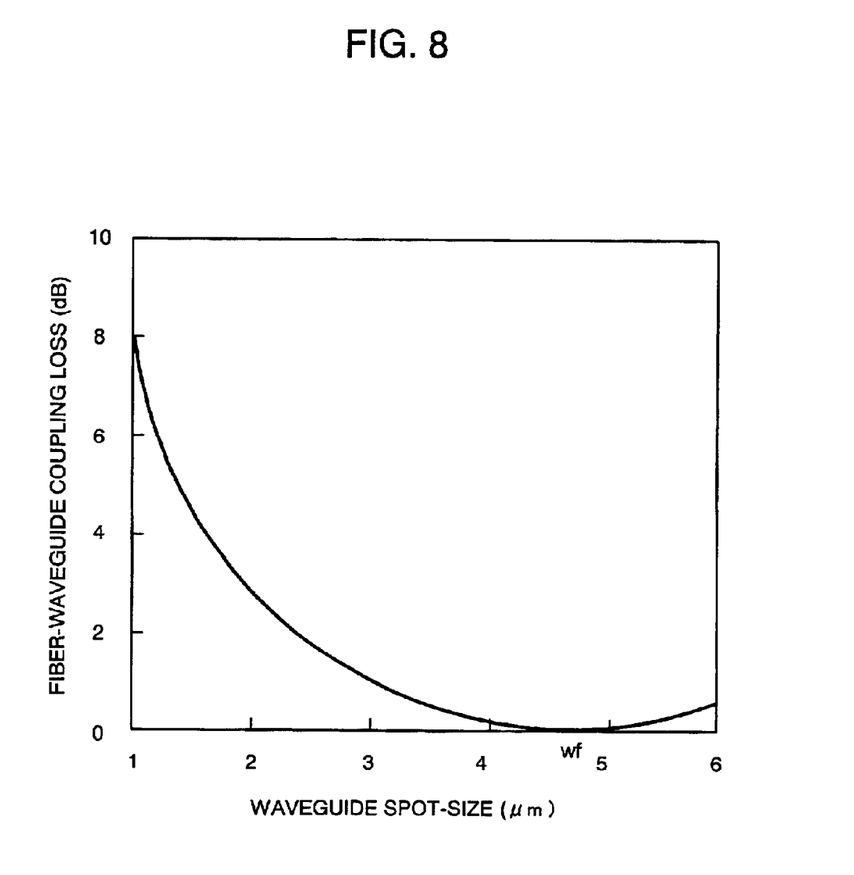
FIG. 8 is a characteristic diagram illustrating a relation of an optical fiber-optical waveguide coupling loss against the spot-size of a fiber port optical waveguide end.

(3) The Optical Fiber-Optical Waveguide Coupling:

In FIG. 8, is illustrated a relation of the optical fiber-optical waveguide coupling loss against the spot-size of the fiber port optical waveguide end. In an example shown in FIG. 8, when the spot-size of light that is guided by the optical waveguide is wf that is a spot-size of the optical fiber, the optical fiber-optical waveguide coupling loss becomes zero dB. Where the spot-size is the other than wf, the coupling loss increases. In particular, in the event that the spot-size is made to be smaller than wf, the coupling loss increases drastically. In this embodiment, the spot-size of the fiber port side of the waveguide 4 is configured so as to accord with the spot-size of the optical fiber, thereby accomplishing the highly efficient coupling between the optical fiber 3 and the waveguide 4.

(Embodiment 2)

Figure 9:
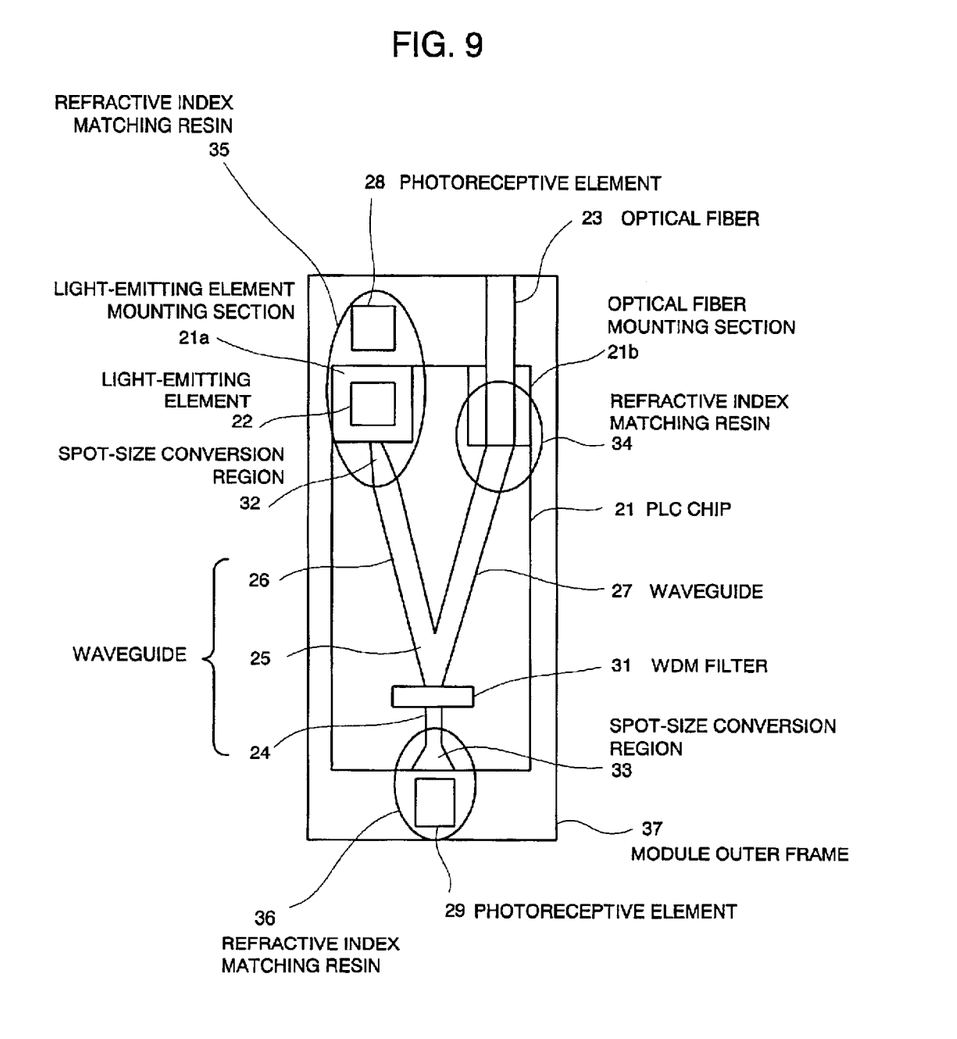
FIG. 9 is a top plan view illustrating a schematic configuration of an optical transmitter/receiver module that is a second embodiment of the present invention.

FIG. 9 is a top plan view illustrating a schematic configuration of an optical transmitter/receiver module that is a second embodiment of the present invention. This optical transmitter/receiver module is a module having a wavelength division multiplex structure in which a layout of the optical active element and the optical waveguide of the structure of the foregoing first embodiment was changed to provide a WDM (Wavelength Division Multiplex) filter 31.

The effect accompanying the spot-size conversion explained in the foregoing first embodiment is also similarly obtained in this embodiment; however, herein, for simplification of explanation, its explanation is omitted for convenience and only the different part from the first embodiment will be explained.

On a substrate are provided and within a module outer frame 37 are contained: a PLC chip 21 in which waveguides 24 to 27, a light-emitting element mounting section 21a and an optical fiber mounting section 21b were formed; a light-emitting element 22 such as the LD mounted on the light-emitting element mounting section 21a on the PLC chip 21; an optical fiber 23 that introduces the send light outside the module or introduces the receive light from the exterior within the module, which was mounted on the optical fiber mounting section 21b on the PLC chip 21; and photoreceptive elements 28 and 29 such as the PD. Refractive index matching resin 34 is charged in the optical coupling part between the fiber port of the waveguide 27 and the optical fiber 23, refractive index matching resin 35 is charged in the optical coupling part between a spot-size conversion region 32 of the end of the light-emitting element 22 side of the waveguide 26 and the light-emitting element 22 and in the optical coupling part between the light-emitting element 22 and the photoreceptive element 28, and refractive index matching resin 36 is charged in the optical coupling part between a spot-size conversion region 33 of the end of the photoreceptive element 29 side of the waveguide 27 and the photoreceptive element 29. Each of these components is basically similar to that of the foregoing first embodiment except component's layout.

The WDM filter 31 is provided between the waveguide 24 and the waveguide 25. This WDM filter 31, which is a wavelength selective filter, has such a characteristic as to transmit only light with a predetermined wavelength band and to reflect light with the other wavelength band than it. In this embodiment, the wavelength of the light (send light) being emitted from the light-emitting element 22 is set at such a wavelength as to be reflected by the WDM filter 31, the wavelength of the light (receive light) being received via the optical fiber 23 is set at such a wavelength as to be transmitted by the WDM filter 31, and a communication operation is performed like the following.

The send light emitted from the light-emitting element 22 enters through the spot-size conversion 32 and is propagated sequentially through the waveguides 26 and 25 to reach the WDM filter 31. The send light that reached the WDM filter 31 is reflected by the WDM filter 31 and is propagated through the waveguide 27 to enter the optical fiber 23. This send light that entered is introduced to the transmission line outside the module by the optical fiber 3.

On the other hand, the receive light received via the optical fiber 3 enters through the end face of the waveguide 27, and is propagated within the waveguide 27 to reach the WDM filter 31. The receive light that reached the WDM filter 31 is transmitted by the WDM filter 31 and is propagated through the waveguide 24 to enter the photoreceptive surface of the photoreceptive element 29 via the spot-size conversion 33.

In each embodiment explained above, the refractive index matching resin is charged in the optical coupling section; however this refractive index matching resin may be dispensed with.

Also, the spot-size conversion, as shown in FIGS. 2 and 3, has a structure having the width and the thickness of the core changed, but the present invention is not limited hereto, and so long as the structure is a structure in which the spot-size can be converted, any structure is acceptable. For example, the structure is acceptable in which only the width or the thickness of the core was changed. Also, since such a spot-size conversion region is of the waveguide structure, it can be built therein together with the waveguide.

Further, the spot-size conversion region is provided only in the LD port and PD port of the optical waveguide, but a similar spot-size conversion region may be also provided in the fiber port. In this case, the spot-size of the waveguide except fiber-port may differ from that of the optical fiber, and a degree of freedom for design improves.

Also, in the foregoing first and the second embodiments, the module is an optical transmitter/receiver module; however, by separating the send part and the receive part, an optical send module and an optical receive module can be configured.

As explained above, in accordance with the present invention, the effect exists: With a simple technique of having the spot-size conversion region including the waveguide structure provided in the end of the optical waveguide, the highly efficient optical couplings can be accomplished between the optical active element such as the light-emitting element (LD) and the photoreceptive element (PD), and the optical waveguide, and between the optical fiber and the waveguide.

Moreover, the effect exists: This spot-size conversion region, which is of the waveguide structure, can be built therein together with the optical waveguide, whereby the effect exists that, as compared with the conventional micro optical system using lenses and so on, the number of the manufacturing process is fewer and the manufacturing cost is lower.

What is claimed is:

1. An optical module comprising:
   a photoreceptive optical element; and
   an optical waveguide formed separately from said photoreceptive optical element, said optical waveguide being optically coupled to said photoreceptive optical element and including a spot-size conversion region, configured by gradually increasing the width or the thickness, or both, of said optical waveguide, at the end or inside of said optical waveguide adjacent to where said photoreceptive optical element is coupled.

2. An optical module for coupling to an optical active element, said optical module comprising:
   an optical waveguide having a spot-size conversion region at an end thereof adapted for coupling to the optical active element, or inside of said optical waveguide, said conversion region configured by gradually increasing or reducing the width or the thickness, or both, of said optical waveguide; and
   an optical coupling part having a refractive index matching resin therein, said resin having the same-level refractive index as that of said optical waveguide, said optical coupling part being adapted to be positioned between said optical waveguide and the optical active element.

3. An optical module comprising first and second optical active elements; and an optical waveguide having spot-size conversion regions, wherein:
   said optical waveguide comprises a Y-type branch optical waveguide having a single-mode waveguide section branched into first and second branch waveguide sections,
   said optical active elements include a light-emitting element optically coupled to said first branch waveguide section, and a photoreceptive element optically coupled to said second branch waveguide section; and said spot-size conversion regions include:
- a first spot-size conversion region configured by reducing the width or the thickness, or both, of said waveguide on the light-emitting element side thereof, said first spot-size conversion region being provided at the end or inside of said first branch waveguide section; and
- a second spot-size conversion region configured by increasing the width or the thickness, or both, of said waveguide on the photoreceptive element side thereof, said second spot-size conversion region being provided at the end or inside of said second branch waveguide section.

4. The optical module according to claim 3, further comprising a refractive index matching resin having the same-level refractive index as that of said single-mode waveguide, said resin being adapted to be between said single-mode waveguide section and an optical fiber.

5. An optical module comprising first and second optical active elements; and an optical waveguide having spot-size conversion regions, wherein:

said optical waveguide comprises a Y-type branch optical waveguide having a single-mode waveguide section branched into first and second branch waveguide sections;

said optical active elements include a light-emitting element optically coupled to said first branch waveguide section, and a photoreceptive element optically coupled to said single-mode waveguide section;

said spot-size conversion regions include:
- a first spot-size conversion region configured by reducing the width or the thickness, or both, of said waveguide on the light-emitting element side thereof, said first spot-size conversion region being provided at the end or inside of said first branch waveguide section; and
- a second spot-size conversion region configured by increasing the width or the thickness, or both, of said waveguide on the photoreceptive element side thereof, said second spot-size conversion region being provided at the end or inside of said single-mode waveguide section; and said optical module further comprises a device for separating lights of different wavelengths, said device being between said single-mode waveguide section and the Y branch, said device reflecting light of a first wavelength, which is emitted from said light-emitting element, towards said second branch waveguide section, and of transmitting light of a second wavelength, different from said first wavelength, which is guided by said second branch waveguide section, toward said single-mode waveguide section.

6. The optical module according to claim 5, further comprising a refractive index matching resin having the same-level refractive index as that of said second branch waveguide, said resin being adapted to be between said second branch waveguide section and an optical fiber.

7. The optical module according to claim 2, further comprising an optical active element coupled to said optical waveguide.

8. The optical module according to 7, wherein said optical active element comprises a light-emitting element.

9. The optical module according to claim 7, wherein said optical active element comprises a photoreceptive element.

10. An optical module, comprising:

a Y-type branch optical waveguide having a single-mode waveguide section branched into a first branch waveguide section, adapted to be coupled to a photoreceptive optical element, and a second branch waveguide section, adapted to be coupled to a second optical element; and optical coupling parts having a refractive index matching resin therein, said resin having the same-level refractive index as that of said optical waveguide, said optical coupling parts being adapted to be positioned between said optical waveguide and the optical elements, wherein:

said first branch waveguide section includes a first spot-size conversion region configured by increasing at least one of the width and the thickness of said waveguide, said first spot-size conversion region being provided at the end or inside of said first branch waveguide section; and said second branch waveguide section includes a second spot-size conversion region configured by decreasing at least one of the width and the thickness of said waveguide, said second spot-size conversion region being provided at the end or inside of said second branch waveguide section.

11. The optical module according to claim 10, further comprising:

a device for separating lights of different wavelengths, said device being between said single-mode waveguide section and the Y branch, said device reflecting light of a first wavelength, which is guided by a first one of said waveguide sections, towards a second one of said waveguide sections, and of transmitting light of a second wavelength, different from said first wavelength, which is guided by said second one of said waveguide sections, toward a third one of said waveguide sections.

12. A method of forming an optical module, said method comprising:

providing a photoreceptive optical element;

providing an optical waveguide; and optically coupling the optical waveguide to the photoreceptive optical element, wherein the optical waveguide includes a spot-size conversion region configured by gradually increasing the width or the thickness, or both, of the optical waveguide at the end or inside of the optical waveguide adjacent to where the photoreceptive optical element is coupled.

13. The method of claim 12, further comprising positioning an optical coupling part between the optical waveguide and the photoreceptive optical element, the optical coupling part having therein a refractive index matching resin having the same-level refractive index as that of the optical waveguide.

* * * * *